United States Patent [19]

Emmons

[11] Patent Number: 4,950,026
[45] Date of Patent: Aug. 21, 1990

[54] PASSENGER VEHICLE BODY FRAME

[76] Inventor: J. Bruce Emmons, 31695 Auburn, Birmingham, Mich. 48009

[21] Appl. No.: 253,702

[22] Filed: Oct. 6, 1988

[51] Int. Cl.$^5$ ............................................. B60R 27/00
[52] U.S. Cl. ..................................... 296/203; 296/204; 296/205; 296/29
[58] Field of Search ................. 296/203, 204, 205, 29, 296/196, 197; 280/800

[56] References Cited

U.S. PATENT DOCUMENTS

| 347,621 | 8/1886 | Lee | 296/29 |
|---|---|---|---|
| 1,773,357 | 8/1930 | Griswold | 296/29 |
| 2,052,535 | 8/1936 | Sherman | 280/800 X |
| 3,061,360 | 10/1962 | Wilfert | 296/205 |
| 4,040,640 | 8/1977 | Begg | 280/800 X |
| 4,533,172 | 8/1985 | Oliver | 296/205 X |
| 4,840,424 | 6/1989 | Asoh | 296/204 |

FOREIGN PATENT DOCUMENTS

| 567081 | 1/1945 | United Kingdom | 296/205 |
|---|---|---|---|
| 501261 | 12/1928 | Fed. Rep. of Germany | 296/203 |
| 834648 | 3/1952 | Fed. Rep. of Germany | 296/203 |
| 2142714 | 3/1972 | Fed. Rep. of Germany | 296/203 |
| 694474 | 9/1930 | France | 296/203 |
| 940982 | 12/1948 | France | 296/205 |

Primary Examiner—Margaret A. Focarino
Assistant Examiner—Gary C. Hoge
Attorney, Agent, or Firm—Dykema Gossett

[57] ABSTRACT

A passenger vehicle body frame comprises a pair of opposed beam members defining a passenger compartment, with front and rear truss assemblies at opposite ends of the beam members spanning and rigidly interconnecting the beam members as their sole lateral reinforcement.

10 Claims, 4 Drawing Sheets

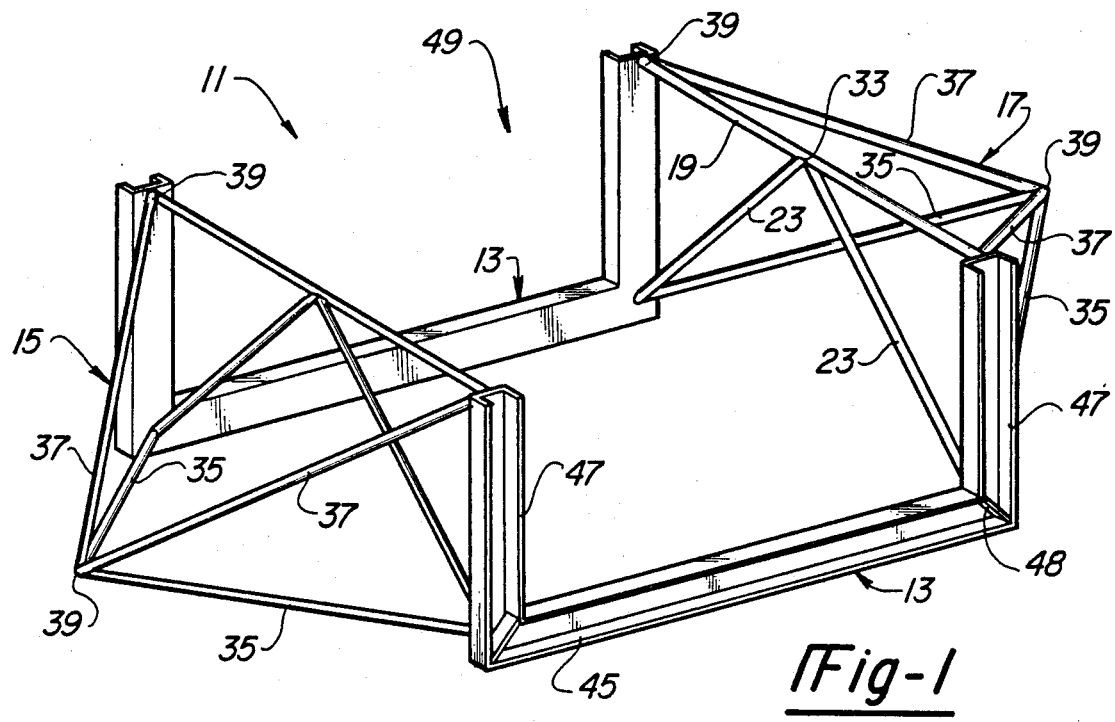
*Fig-1*
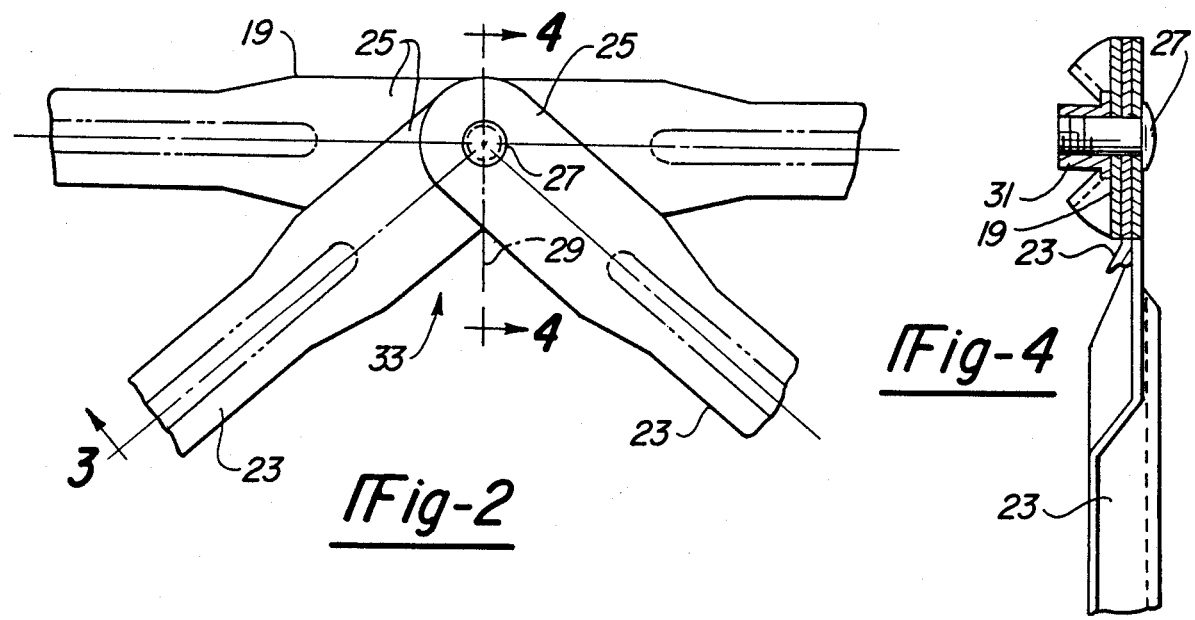
*Fig-2*  *Fig-4*
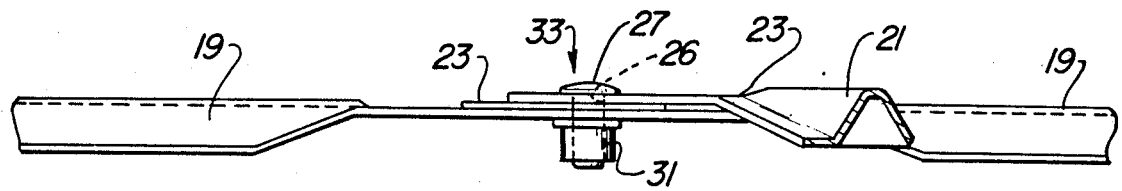
*Fig-3*

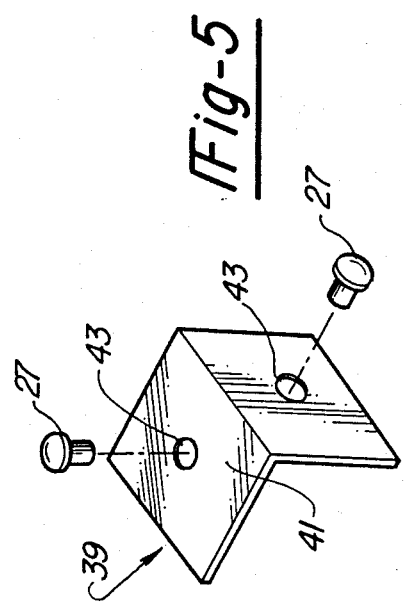
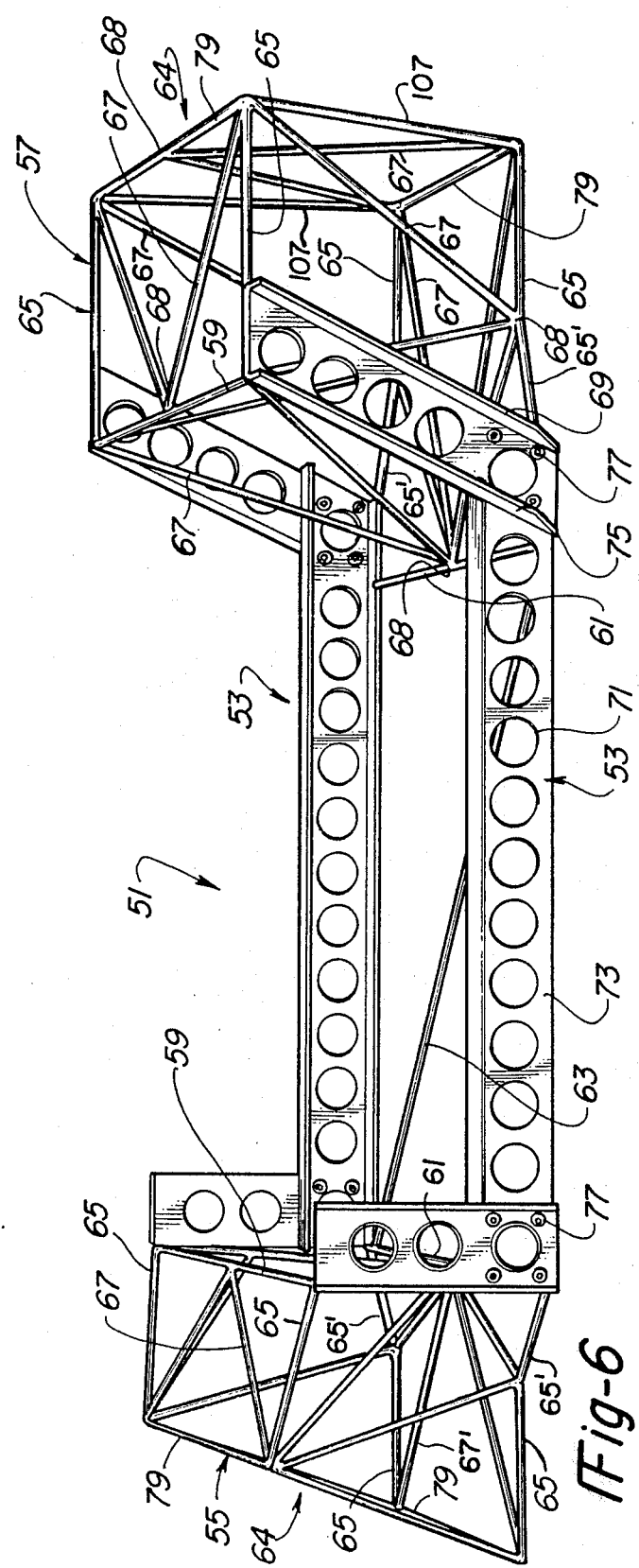

4,950,026

PASSENGER VEHICLE BODY FRAME

FIELD OF INVENTION

The invention relates to a passenger vehicle body frame employing beam members and truss assemblies.

BACKGROUND OF THE INVENTION

Previously, in the construction of passenger vehicle body frames, essentially channel members have been employed of the general ladder-type construction or the unibody structures used today. Some effort has been made to employ struts and trusses in conjunction with vehicle body frames. However, essentially most of these have involved combinations which included the ladder-type frame or unibody structure with the use of some struts.

THE PRIOR ART

Previous vehicle body frames involving essentially conventional ladder frames or unibody structures are shown in one or more of the following United States patents:

| U.S. Pat. No. | Issued | Inventor |
|---|---|---|
| 711,441 | October 14, 1902 | Riker |
| 1,303,339 | May 13, 1919 | Liddell |
| 1,476,062 | December 4, 1923 | Eccles |
| 1,591,215 | July 6, 1926 | Jacobs |
| 1,593,783 | July 27, 1926 | Stresau |
| 2,173,525 | March 10, 1936 | Wallace |
| 2,257,835 | October 7, 1941 | Best |
| 2,448,172 | August 31, 1948 | Couse |
| 2,500,659 | March 14, 1950 | Burwell |
| 2,837,347 | June 3, 1958 | Barenyi |
| 3,528,678 | September 15, 1970 | Moulton |
| 4,369,559 | January 25, 1983 | Phillips |
| 4,402,380 | September 6, 1983 | Strong |
| 4,521,049 | June 4, 1985 | Genma et al. |
| 4,460,527 | February 3, 1987 | Taylor |

SUMMARY OF THE INVENTION

The present invention is directed to an automotive frame composed of both beam-type members and spaced frame-type tension/compression links. Rigidly joined beam members are located along the rocker panels, the hinge pillars and the latch pillars. The beam members are connected from one side of the vehicle to the other by several tension/compression links. The overall arrangement of this basic frame includes at the opposite ends of a pair of upright beam members front and rear truss assemblies which span and rigidly interconnect the beam members as a rigid unit construction.

An important feature of the present invention is to utilize the front and rear truss assemblies for rigidly interconnecting the beam members as a rigid unit construction with the truss assemblies being the sole frame lateral reinforcement between the beam members.

Another important feature is to provide a primary vehicle frame structure wherein a pair of opposed spaced generally parallel beam members have arranged upon opposite ends and secured thereto fore and aft truss assemblies which are secured thereto and which span and rigidly interconnect the beam members as a rigid unit construction.

As a further feature, each of the truss assemblies includes a transverse cross-body strut at its ends rigidly connected to the beam members.

As another feature, the truss assembly further includes a pair of coplanar angular struts, at their one ends connected together and to the cross-body strut intermediate its ends and at their other ends connected to lower portions of the beam members respectively. Respective cross-body struts preferably interconnect upper portions of the beam members.

As another feature, each truss assembly further includes converging pairs of coplanar outwardly converging angular struts at their one ends all connected together and at their other ends connected to upper and lower portions of adjacent beam members respectively.

As another feature, the struts in the truss assemblies are U-shaped in cross-section, with their ends flattened and apertured and adapted for fastening to each other and to adjacent struts and beam members, employing a plurality of bolts.

As another feature, an improved bolt assembly is employed wherein there is provided a series of longitudinally spaced ridges over which a nut is positioned and swaged for a semi-permanent connection of the respective parts making up the vehicle body frame.

Still another feature of the present invention is to provide for each of the truss assemblies parallel spaced transverse cross-body struts which interconnect upper and lower portions of adjacent ends of the beam members and outwardly positioned box-like truss members aligned with the beam members, including parallel vertically spaced transverse cross-struts, opposed pairs of vertically spaced horizontal struts connected to the latter cross-struts and to the beam members respectively, and a plurality of diverging angular struts with their one ends converging and connected together and to an adjacent strut with their other ends connected to spaced portions of said struts and to the beam members respectively.

As a further feature, the present vehicle body frame includes at its opposite ends a pair of energy-absorbing truss assembly sections which are rigidly connected to the front and rear truss assemblies arranged outwardly thereof and aligned therewith.

These and other features and objects will be seen from the following specification and claims in conjunction with the appended drawings.

THE DRAWINGS

FIG. 1 is a front perspective view of the basic passenger vehicle body frame.

FIG. 2 is a fragmentary end view of a transverse cross-body strut with connected angular struts on an increased scale.

FIG. 3 is a bottom plan view thereof.

FIG. 4 is a fragmentary section taken in the direction of arrows 4—4 of FIG. 2.

FIG. 5 is a front perspective view of an angular connector employed in the truss assembly connections between angularly related struts and angular struts.

FIG. 6 is a side perspective view of a modified passenger vehicle body frame.

Figure 7:
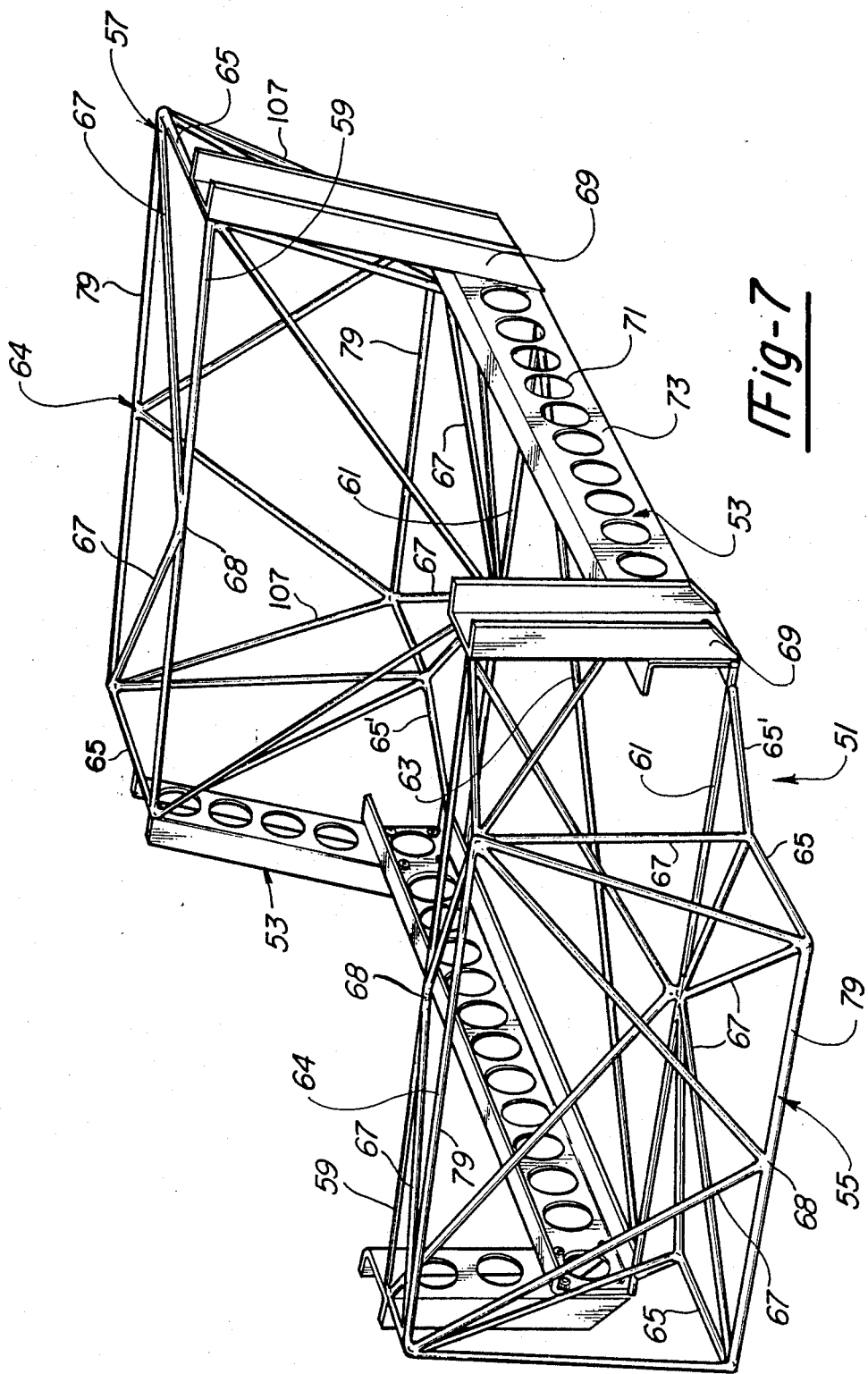
FIG. 7 is a front perspective view thereof.

It will be understood that the above drawings illustrate merely preferred embodiments of the invention, and that other embodiments are contemplated within the scope of the claims hereafter set forth.

DETAILED DESCRIPTION OF AN EMBODIMENT OF THE INVENTION

Referring to the drawings, FIG. 1, the basic passenger vehicle body frame is shown at 11 including a pair of upright, generally parallel spaced beam frame members 13 of general U-shape. Energy-absorbing front truss assembly 15 spans the ends of the upright beam members, and a rear truss assembly 17 spans the other ends of said beam members, with both truss assemblies rigidly connected thereto.

Each of the truss assemblies 15 and 17 includes a transverse cross-body strut 19 at its ends rigidly connected to the beam members 13, preferably at their upper ends.

Each of the struts 19 and the angular struts 23 are in the form of U channels 21, FIG. 3, for stiffening the strut with the respective end or intermediate portions flattened at 25 and apertured as at 26 and adapted to receive the fastening bolts 27.

In the illustrated embodiment, each of the truss assemblies 15 and 17 include the top cross-body strut 19 and a pair of diverging angular struts 23 at their one ends connected together as at 33, FIG. 1, to cross-body strut 19, in the manner shown in FIG. 2, and along the center line 29 which corresponds to the longitudinal center line for the vehicle body frame 11.

In the illustrated embodiment, the bolts or fasteners 27 are of the Huck TM type of bolt which includes a series of tapered annular ridges over which the sleeve-type nut 31 is positioned and swaged thereon with the metal sufficiently flowing as to form a substantially permanent connection such as shown in FIGS. 2 and 3.

In the illustrated embodiment, wherein the angular struts 23 overlap at their flattened ends with a flattened portion 25 of the cross-strut 19, the present bolt 27 projects through the corresponding apertures 26 therethrough and is secured in position such as shown in FIG. 3 by fastener 31 which is swaged thereon.

Each of the respective truss assemblies 15 and 17 includes the forwardly-converging angular struts 35 arranged generally in a horizontal plane for illustration. Additional outwardly and downwardly-converging angular struts 37 lie in the same plane respectively as the struts 35 and are all connected together at the apex or multiple joint 39, FIG. 1.

Thus, the vehicle body frame includes for each truss assembly converging pairs of coplanar, outwardly-converging angular struts 35 and 37, at their one ends all connected together at 39, and at their other ends connected to upper and lower portions of the adjacent beam members 13, FIG. 1.

FIGS. 2, 3, 4 and 5 illustrate the nature of the connections of the respective cross-body struts 19, angular struts 23 and the respective beam assemblies 13 employing the fastener assemblies 27, 31 throughout, and wherein there is provided a semi-permanent rigid cross structure at the respective opposite ends of the beam frame members 13 which define the passenger compartment 49 within the frame.

In the case of a multiple strut joint or the connection of two or more struts to a beam frame member wherein some of the members extend at an angle but in a different plane from the other member, there are employed the present right-angle connectors 41, FIG. 5, where each angular face is apertured as at 43 to receive the corresponding fasteners 27, 31.

In the illustrated embodiment, the respective beam frame members 13 are constructed of horizontal outwardly-opening channels connected by a miter joint 48 as a welded construction which includes upright end channels 47 and the central bottom channel 45. It is contemplated that instead of a miter joint, the respective ends of the members 45 and 47 could be overlapped and bolted together as shown in FIGS. 6 and 7.

MODIFICATION

Referring to FIGS. 6 and 7, a modified vehicle body frame is designated at 51 which includes a pair of spaced, opposed, generally parallel upright beam frame members 53 of general U-shape in cross-section. The respective opposite ends of the beam frame members 53 are rigidly interconnected by the front and rear truss assemblies 55 and 57 which provide a rigid unit construction for connecting the opposite ends of the beam assemblies as their primary lateral reinforcement.

The respective truss assemblies 55 and 57 include transverse spaced top and bottom cross-body struts 59 and 61 at their ends connected to end portions of the respective beam frame members 53. Diagonal strut 63 extends between opposite sides of the beam frame members 53 interconnecting their opposite ends adjacent the lower ends thereof.

The respective truss assemblies 55 and 57 include outwardly positioned box-like truss members 64 which include parallel, vertically spaced cross body struts 59, 61. Opposed pairs of vertically spaced longitudinal struts 65 are connected at their one ends to the cross-struts 59, 61 and at their other ends are connected respectively to the ends of upper and lower cross-struts 79. The box-like truss members 64 further include a plurality of diverging angular struts 67, with their one ends converging and connected together to an adjacent strut as at 68, and with their other ends connected to spaced portions of struts 79 and 59 respectively. A pair or laterally spaced generally upright struts 107 at their ends are connected to opposite ends of cross struts 79, respectively, and to the horizontal struts 65. The lower horizontal struts 65 of each truss assembly have extensions 65' which are inclined angularly outward and connected to said beam members 53 respectively, defining lateral clearance recesses upon opposite sides of the truss assemblies.

The present upright beam frame members 53 include the upright outwardly-opening channels 69 of general U-shape with a series of longitudinally-spaced apertures 71 therethrough and the overlapped horizontal apertured channel 73. The overlapped ends at 75 interconnected by a series of fasteners 77. In the illustrated embodiment, fasteners may be employed similar to the Huck TM bolts 27, 31 shown in FIGS. 2, 3 and 4. This is the same method of connecting the respective truss assemblies, cross-struts and angular struts to end portions of the upright beam members.

The respective box-like truss members further include a series of cross-struts 79, sometimes referred to as a pair of transverse, vertically-spaced cross-struts, FIGS. 6 and 7.

Each of the cross-truss assemblies includes spaced transverse cross-body struts 59, 61 interconnecting upper and lower portions of adjacent ends of the beam members 53. The box-like truss members 64 are aligned with the beam members, and includes parallel, vertically-spaced transverse cross-struts 79, opposed pairs of vertically-spaced longitudinal struts 65 connected to the cross-struts 59, 61, 79 and to the beam members 53 respectively. There are a plurality of diverging angular struts 67 with their one ends converging and connected together at 68 to the adjacent strut and with their other ends connected to spaced portions of the struts 79, 59.

MODIFICATION

Figure 9:
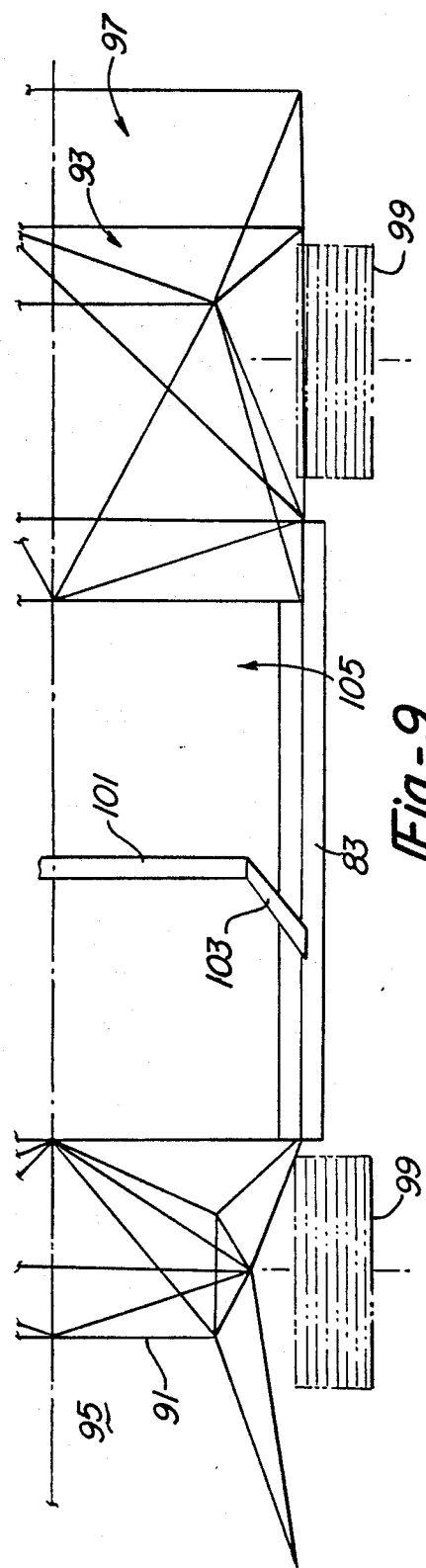
FIG. 9 is a fragmentary plan view thereof along the center line of the frame shown in FIG. 8.
Figure 8:
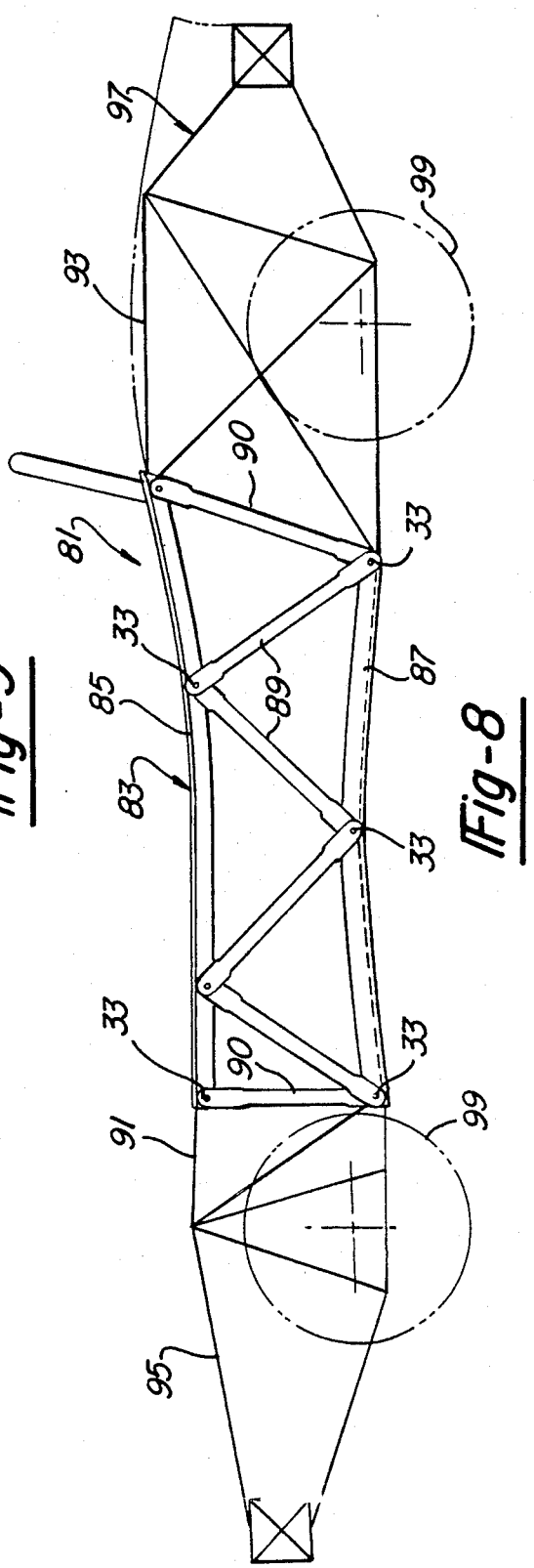
FIG. 8 is a fragmentary and schematic side elevational view of a modified passenger vehicle body frame with the upright beam members constructed as two-dimensional trusses.

A modified vehicle body frame is designated at 81, FIGS. 8 and 9, which includes a pair of opposed, upright, two-dimensional beam frames 83, one of which is shown in the drawings.

Each of the upright beam members 83 or two-dimensional trusses includes a top channel 85 and spaced therebelow a bottom channel 87. Interposed therebetween and connected thereto are a plurality of angularly-related angular struts 89 which are connected to each other and to the corresponding top and bottom channels 85 and 87 by the connectors 33. The two-dimensional truss side frame shown in FIG. 8 is completed by the end struts 90 which are substantially upright and connected to the respective channels 85, 87 by similar fasteners 33.

As in the embodiments shown in FIGS. 1 and 6, the opposite ends of the two-dimensional truss side frames are rigidly interconnected by front three-dimensional truss 91 and the rear three-dimensional truss 93. The truss assemblies 91 and 93 span and rigidly interconnect the beam members 83 in a rigid unit construction as a sole frame lateral reinforcement therebetween. In the illustrated embodiment, the respective angular struts 89 and 90 are angularly related with respect to each other and suitably connected by the common bolt 33.

Arranged forwardly of the front three-dimensional truss 91 is the front energy-absorbing truss section 95. Arranged rearwardly of the rear three-dimensional truss 93 is the rear energy-absorbing truss section 97 as schematically shown.

In the illustrative embodiment shown in FIG. 8, the vehicle body frame 83 is shown superimposed with respect to the vehicle wheels 99, and wherein there is shown fragmentarily in FIG. 9 the transverse wind screen box 101 forming a part of the frame construction. Said box includes the depending side members 103 connected to the corresponding side frames 83. A transverse floor 105 is interposed between the lower ends of the respective truss side frames 83 and secured thereto defining a shear panel which laterally interconnects the side frames 83 adjacent their lower ends.

Having described my invention, reference should now be had to the following claims:

I claim:

1. A passenger vehicle body frame comprising a pair of generally parallel opposed upright beam members defining a passenger compartment therebetween;
   front and rear truss assemblies at opposite ends of said beam members spanning and rigidly interconnecting the beam members in a rigid unit construction, the truss assemblies being the primary frame lateral reinforcement between the beam members;
   said truss assemblies each being three dimensional having a top, a bottom, opposed sides, a front and a back; and
   each of said top, bottom, sides, front and back including a generally planar truss, having a plurality of interconnected struts defining a series of adjacent rigidly interconnected triangles.

2. In the passenger vehicle body frame of claim 1, further comprising there being at least six generally planar trusses making up each of said three dimensional trusses.

3. A passenger vehicle body frame comprising a pair of generally parallel opposed upright beam members defining a passenger compartment therebetween;
   front and rear truss assemblies at opposite ends of said beam members spanning and rigidly interconnecting the beam members in a rigid unit construction, the truss assemblies being the primary frame lateral reinforcement between the beam members;
   said truss assemblies including at least one upper cross-body strut (59) and at least one lower cross-body strut (61), each interconnecting said beam members, a plurality of cross struts (79), and at least one angular strut (67), one end of said at least one angular strut (67) being connected to a spaced portion of said at least one lower cross-body strut (61) and an opposite end of said at least one angular strut (67) being connected to an end portion of said at least one upper cross-body strut (59).

4. In the vehicle body frame of claim 3, the struts in said truss assemblies being U-shaped in cross-section with their ends flattened and apertured, and
   a plurality of fasteners extending through said apertured end portions, and through apertures in said beam members for connecting the respective struts to each other and to said beam members for a substantially permanent connection.

5. A passenger vehicle body frame comprising a pair of generally parallel opposed upright beam members having lower ends, horizontal and vertical parts, and defining a passenger compartment therebetween;
   front and rear truss assemblies at opposite ends of said beam members spanning and rigidly interconnecting the beam members in a rigid unit construction, the truss assemblies being the primary frame lateral reinforcement between the beam members;
   each of said truss assemblies including a plurality of upper (59) and lower (61) transverse cross-body struts interconnecting upper and lower portions of adjacent ends of said beam members, respectively;
   an outwardly positioned box-like truss member (64) aligned with said beam members and including a plurality of parallel vertically spaced transverse cross struts (79);
   opposed pairs of vertically spaced upper and lower horizontal struts (65) being connected at one end thereof to said cross struts (79), and at an opposite end thereof to said beam members (53);
   a first pair of angular struts (67), each angular strut having upper ends, said upper ends of said struts converge (68) and are connected to each other and to one of said upper cross-body struts (59), and their opposite ends are connected to end portions of one of said cross struts (79); and
   a second pair of angular struts (67), each angular strut having lower ends, said lower ends of said struts converge (68) and are connected to each other and to one of said lower cross-body struts (61), and their opposite ends are connected to end portions of one of said cross struts (79); and
   a third pair of spaced upright angular struts (67), each angular strut having lower ends, said lower ends of said struts converge (68) and are connected to each other and to one of said lower cross-body struts (61), and their opposite ends are connected to end portions of one of said upper cross-body struts (59); and a fourth pair of spaced upright angular struts (67), each angular strut having ends, said ends of said struts converge (68) and are connected to each other and to one of said cross struts (79), and their opposite ends are connected to another of said cross struts (79).

6. In the vehicle body frame of claim 5, further comprising a fifth pair of spaced upright angular struts (67), each angular strut having ends, said ends of said struts converge (68) and are connected to each other and to one of said horizontal struts (65) and their opposite ends are connected to another of said horizontal struts (65).

7. In the vehicle body frame of claim 5, further comprising one of said truss assemblies including a pair of laterally spaced generally upright struts (107), each upright strut (107) having an end connected to an end of one of said cross struts (79), and an opposite end connected to an end of one of said horizontal struts (65).

8. In the vehicle body frame of claim 5, further comprising the lower horizontal struts (65) of each truss assembly having extensions (65') which are inclined angularly inward from said beam members (53), respectively, defining lateral clearance recesses upon opposite sides of the truss assemblies.

9. In the vehicle body frame of claim 5, the horizontal and vertical parts of each beam member being U-shaped in cross-section.

10. In the vehicle body frame of claim 5, a diagonal strut extending between and connected to opposite ends of said beam members adjacent their lower ends.

* * * * *